United States Patent
Hu et al.

(10) Patent No.: US 10,372,017 B2
(45) Date of Patent: Aug. 6, 2019

(54) TRI-AXIS CLOSED-LOOP ANTI-SHAKE STRUCTURE

(71) Applicant: TDK TAIWAN CORP., Taoyuan County (TW)

(72) Inventors: Chao-Chang Hu, Yangmei (TW); Shu-Shan Chen, Yangmei (TW); Cheng-Kai Yu, Yangmei (TW); Bing-Ru Song, Yangmei (TW)

(73) Assignee: TDK TAIWAN CORP., Yangmei, Taoyuan County (TW)

( * ) Notice: Subject to any disclaimer, the term of this patent is extended or adjusted under 35 U.S.C. 154(b) by 0 days.

(21) Appl. No.: 15/894,080

(22) Filed: Feb. 12, 2018

(65) Prior Publication Data

US 2018/0164660 A1    Jun. 14, 2018

Related U.S. Application Data

(62) Division of application No. 14/712,056, filed on May 14, 2015, now Pat. No. 9,927,681.

(30) Foreign Application Priority Data

May 15, 2014    (TW) .............................. 103117105 A

(51) Int. Cl.
| | |
|---|---|
| *G03B 5/00* | (2006.01) |
| *G02B 27/64* | (2006.01) |
| *G02B 7/04* | (2006.01) |
| *H02K 41/035* | (2006.01) |
| *H04N 5/232* | (2006.01) |

(52) U.S. Cl.
CPC ................. *G03B 5/00* (2013.01); *G02B 7/04* (2013.01); *G02B 27/646* (2013.01); *H02K 41/0356* (2013.01); *G03B 2205/0015* (2013.01); *H04N 5/23287* (2013.01)

(58) Field of Classification Search
CPC ............... G03B 5/00; G03B 2205/007; G03B 2217/005; G02B 27/04; G02B 27/646; G02B 27/64; H04N 5/23287
USPC .............................. 359/824; 396/52–55, 421
See application file for complete search history.

(56) References Cited

U.S. PATENT DOCUMENTS

| | | | | |
|---|---|---|---|---|
| 2008/0144201 | A1* | 6/2008 | Koc ....................... | G02B 7/021 359/824 |
| 2012/0134631 | A1* | 5/2012 | Chiang ............... | B29C 45/0013 385/88 |
| 2013/0194683 | A1* | 8/2013 | Machida .................. | G02B 7/04 359/814 |

\* cited by examiner

*Primary Examiner* — Kristina M Deherrera
(74) *Attorney, Agent, or Firm* — Locke Lord LLP; Tim Tingkang Xia, Esq.

(57) ABSTRACT

Provided is a lens driving device includes a lens holder for carrying a lens; a frame for receiving the lens holder; a first driving component for driving the lens holder to move along a first direction in respect to the frame; a base moveably connected to the frame; a second driving component for driving the frame to move along a second direction in respect to the base, and a position sensor disposed on the frame for sensing a change in a position of the lens holder along the first direction in respect to the frame, wherein the first direction is not parallel to the second direction.

4 Claims, 6 Drawing Sheets

TRI-AXIS CLOSED-LOOP ANTI-SHAKE STRUCTURE

CROSS REFERENCE TO RELATED APPLICATIONS

This application is a Divisional Application of U.S. application Ser. No. 14/712,056 filed on May 14, 2015, and claims priority under 35 U.S.C. 119(e) to Taiwan Application Serial No. 103117105 filed on May 15, 2014, the entire contents of which are incorporated by reference herein.

BACKGROUND OF THE INVENTION

Field of the Invention

The present invention relates to tri-axis anti-shake structures, and more particularly, to a tri-axis anti-shake structure for use with a picture-taking module.

Description of the Prior Art

In recent years, camera devices are becoming popular. Users taking pictures with a picture-taking device seldom have the picture-taking device held by a highly stable tripod. In dim circumstances where safety shutter is unavailable, the users tend to press a shutter shakily, and in consequence pictures thus taken look blurry.

Conventional anti-shake techniques include electronic compensation technique and optical compensation technique. The electronic compensation technique involves controlling the capturing of images with an electronic system of a picture-taking device, involves restoring images with an algorithm, and involves taking a plurality of images successively before selecting the sharpest one from the plurality of images successively taken. The optical compensation technique involves attaining compensation according to the displacement of an optical lens module or a photosensitive module so as to offset the impact of the vibration of the camera and maintain the stability of the optical system.

The trend toward increasingly compact and lightweight cameras poses a problem—if a built-in anti-shake system uses a flexible board to effectuate component and signal electrical connection, there will be great difficulty in assembling the anti-shake system with a conventional production line. Hence, it is imperative to provide a simple way of assembling an anti-shake system.

SUMMARY OF THE INVENTION

In view of the aforesaid drawbacks of the prior art, it is an objective of the present invention to provide an anti-shake structure and more particularly provide a tri-axis closed-loop anti-shake structure based on a Molded Interconnect Device. For one skilled in the art, Molded Interconnect Devices (MID) refer to Molded components with an electrical circuit directly formed on 3D surfaces (e.g., "MIPTEC" and "LDS" MID technologies).

According to an embodiment of the present invention, a lens driving device comprises: a lens holder including a coil; a frame for receiving the lens holder; a driving circuit board disposed below the frame; a plurality of first conductive elastic bodies disposed in a manner to keep the lens holder moving in a Z-axis direction; and a plurality of second conductive elastic bodies disposed in a manner to keep the frame moving in a direction perpendicular to the Z-axis direction, characterized in that: the lens driving device further comprises a plurality of electrical contact-oriented Z-axis position sensor, wherein the Z-axis position sensor senses a motion of the lens holder in the Z-axis direction, wherein an electronic circuit between a portion of the plurality of electrical contacts and the coil of the lens holder comprises a Molded Interconnect Device and a portion of the first conductive elastic bodies, with the Molded Interconnect Device disposed on the frame.

According to the aforesaid embodiment of the present invention, an electronic circuit between another portion of the plurality of electrical contacts and the driving circuit board comprises the Molded Interconnect Device and the second conductive elastic bodies.

According to the aforesaid embodiment of the present invention, the first conductive elastic bodies are each an upper plate spring.

According to the aforesaid embodiment of the present invention, the second conductive elastic bodies are each a sling.

According to the aforesaid embodiment of the present invention, the Z-axis position sensor is disposed on the frame, and the electrical contacts are electrically directly connected to the Molded Interconnect Device.

According to the aforesaid embodiment of the present invention, the Z-axis position sensor is disposed on a flexible circuit board, and the electrical contacts are electrically connected to the Molded Interconnect Device through the flexible circuit board.

According to the aforesaid embodiment of the present invention, the flexible circuit board is disposed on the frame.

According to the aforesaid embodiment of the present invention, the plurality of second conductive elastic bodies are electrically connected to the Molded Interconnect Device, characterized in that: the lens driving device electrically drives the Z-axis position sensor with the plurality of second conductive elastic bodies and the Molded Interconnect Device; and the lens driving device obtains signals sensed by the Z-axis position sensor with the plurality of second conductive elastic bodies and the Molded Interconnect Device.

According to the aforesaid embodiment of the present invention, the Molded Interconnect Device comprises a plurality of conducting wires electrically connected to the first conductive elastic bodies or the second conductive elastic bodies, respectively.

According to the aforesaid embodiment of the present invention, the Molded Interconnect Device comprises conducting wires with a 3D framework.

According to another embodiment of the present invention, a lens driving device comprises: a lens holder including a coil; a frame for receiving the lens holder; a driving circuit board disposed below the frame; a plurality of first conductive elastic bodies disposed in a manner to keep the lens holder moving in a Z-axis direction; and a plurality of second conductive elastic bodies disposed in a manner to keep the frame moving in a direction perpendicular to the Z-axis direction, characterized in that: the lens driving device further comprises a plurality of electrical contact-oriented Z-axis position sensor, wherein the Z-axis position sensor senses a motion of the lens holder in the Z-axis direction, wherein an electronic circuit between a portion of electrical contacts and the driving circuit board comprises a Molded Interconnect Device, the first conductive elastic bodies, and the second conductive elastic bodies, with the Molded Interconnect Device disposed on the lens holder.

According to the aforesaid embodiment of the present invention, another portion of electrical contacts are electrically connected to the coil of the lens holder.

According to the aforesaid embodiment of the present invention, the first conductive elastic bodies are each an upper plate spring.

According to the aforesaid embodiment of the present invention, the second conductive elastic bodies are each a sling.

According to the aforesaid embodiment of the present invention, the Z-axis position sensor is disposed on the lens holder, and the electrical contacts are electrically directly connected to the Molded Interconnect Device.

According to the aforesaid embodiment of the present invention, the Z-axis position sensor is disposed on a flexible circuit board, and the electrical contacts are electrically connected to the Molded Interconnect Device through the flexible circuit board.

According to the aforesaid embodiment of the present invention, the flexible circuit board is disposed on the lens holder.

According to the aforesaid embodiment of the present invention, the plurality of second conductive elastic bodies are electrically connected to the Molded Interconnect Device, characterized in that: the lens driving device electrically drives the Z-axis position sensor with the plurality of second conductive elastic bodies and the Molded Interconnect Device; and the lens driving device obtains signals sensed by the Z-axis position sensor with the plurality of second conductive elastic bodies and the Molded Interconnect Device.

According to the aforesaid embodiment of the present invention, the Molded Interconnect Device comprises a plurality of conducting wires electrically connected to the first conductive elastic bodies, respectively.

According to the aforesaid embodiments of the present invention, the Molded Interconnect Device comprises conducting wires with a 3D framework.

After studying non-restrictive specific embodiments and drawings of the present invention, persons skilled in the art can gain insight into the aforesaid and other aspects of the present invention.

DETAILED DESCRIPTION OF THE EMBODIMENTS

To facilitate the comprehension of the technical features, contents, advantages, and achievable effects of the present invention, the present invention is illustrated with drawings and embodiments and described below. The drawings, which serve exemplary and supplementary purposes, are not necessarily drawn to scale; hence, the drawings are illustrative rather than restrictive of the claims of the present invention.

Specific embodiments of the present invention are hereunder illustrated with drawings. The drawings are not necessarily drawn to scale. Conventional components are omitted from the some of the drawings for the sake of brevity.

Figure 1:
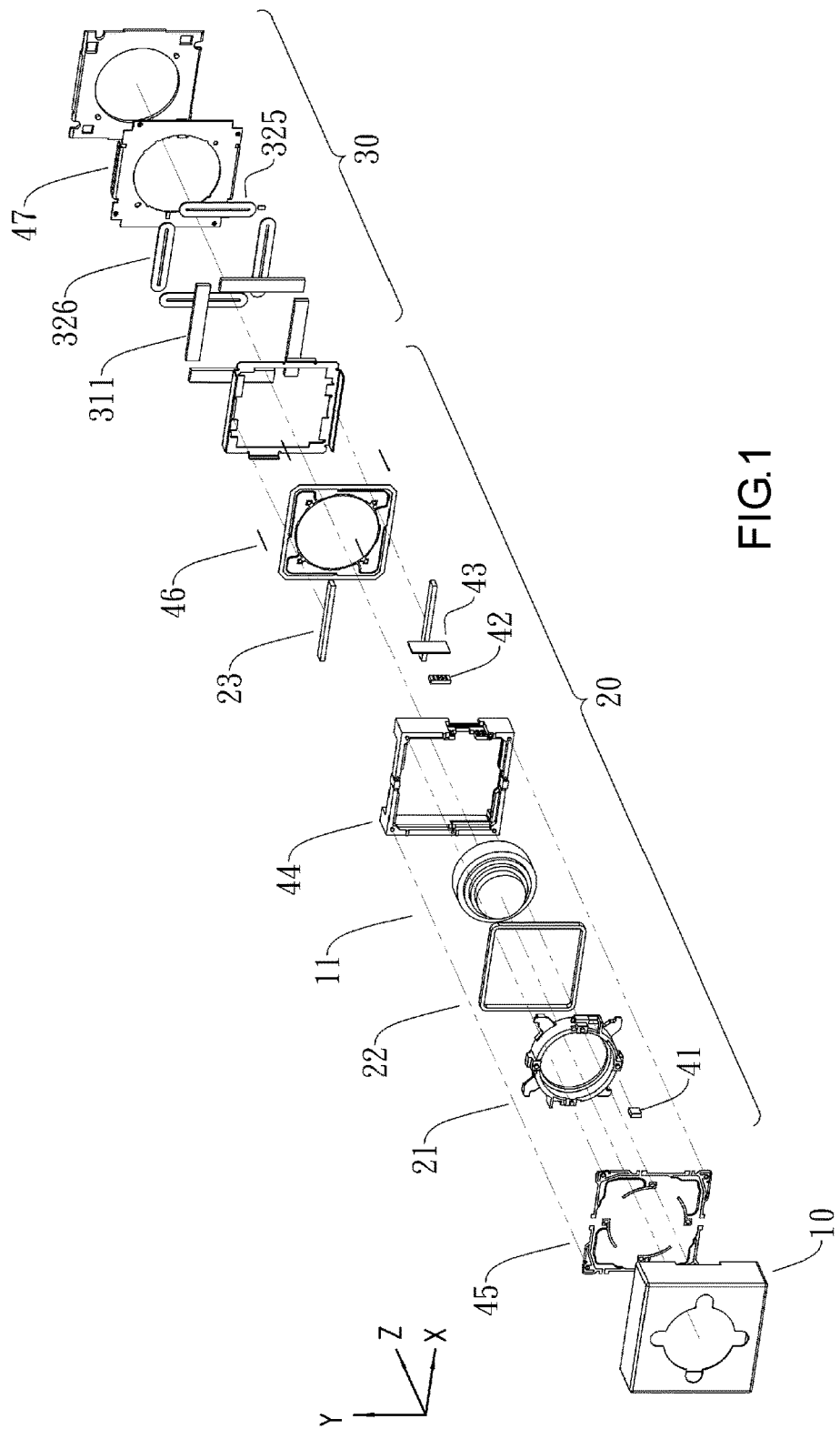
FIG. 1 is an exploded view of a tri-axis anti-shake structure according to the first embodiment of the present invention.

Referring to FIG. 1, there is shown an exploded view of a tri-axis anti-shake structure according to the first embodiment of the present invention. In the first embodiment of the present invention, the tri-axis anti-shake structure comprises an external frame 10, an optical autofocus module 20, an image anti-shake module 30, and an image sensing component. The optical autofocus module 20, the image anti-shake module 30, and the image sensing component are aligned in a light axis direction.

The optical autofocus module 20 carries a lens 11 and performs autofocus in the light axis direction (z-axis) to focus an image on the image sensing component. The image anti-shake module 30 performs image correction in a direction perpendicular to the light axis direction (x-axis or y-axis).

After the image anti-shake module 30 has used X-axis, Y-axis displacement sensors to sense displacement shifts along X-axis and Y-axis, respectively, a driving circuit board 47 is informed of the displacement shifts and then electrically drives an X-axis driving coil 325 and a Y-axis driving coil 326 to produce an electromagnetic field so as to drive X-axis, Y-axis magnets 311 to undergo X-axis movement and Y-axis movement and thus correct X-axis, Y-axis instantaneous shift positions of the optical autofocus module 20, thereby effectuating X-axis, Y-axis closed-loop anti-shake control (see Taiwan Patent 1414816).

To enable the optical autofocus module 20 to perform autofocus, a Z-axis position sensor 42 disposed on a circuit board 43 operates in conjunction with a Hall sensor magnet 41 to sense a change in the magnetic field and thus measure a change in the Z-axis position of the lens. The Z-axis position sensor 42 sends at least a driving compensation signal to a Molded Interconnect Device 49 of a frame 44 through the circuit board 43. In this embodiment, the circuit board 43 is disposed on the frame 44, and the Hall sensor magnet 41 is disposed on a lens holder 21. However, in the spirit able to complete the creation of the present invention, the circuit board 43 and the Hall sensing magnet 41 is not limited to this configuration, for example, the circuit board 43 disposed on the lens holder 21, and the Hall sensing magnet 41 disposed on the frame 44.

Figure 2:
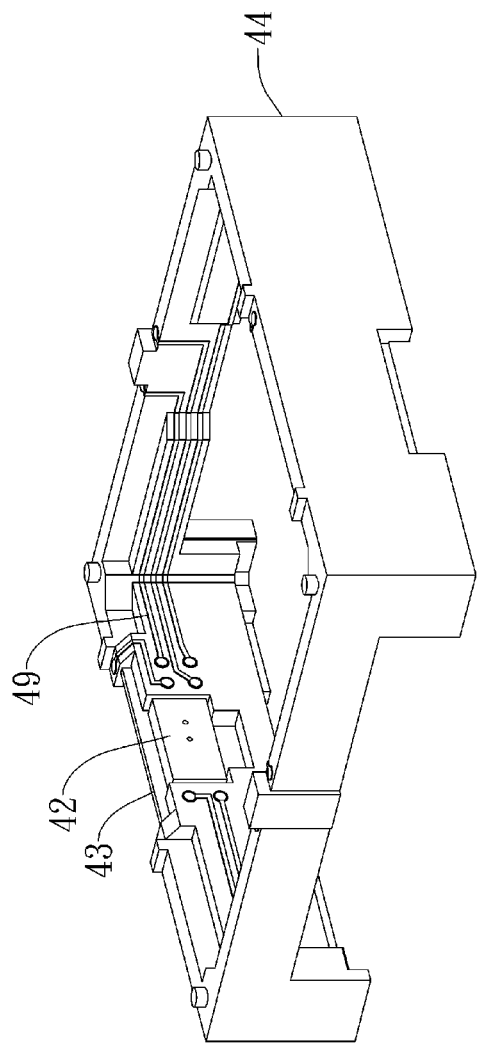
FIG. 2 is a perspective view of a frame according to the first embodiment of the present invention.

Referring to FIG. 2, there is shown a perspective view of the frame 44. As shown in the diagram, the Z-axis position sensor 42 has a plurality of electrical contacts. A plurality of electrical signals are sent from the plurality of electrical contacts through the circuit board 43 and the Molded Interconnect Device 49. The Molded Interconnect Device 49 comprises conducting wires with a 3D framework. The 3D framework of the Molded Interconnect Device 49 is disposed on the surface of the frame 44. The two ends of each conducting wire are in electrical contact with the circuit board 43 and a first elastic conductive body 45, respectively, to form a signal transmission path. In an embodiment, the circuit board 43 is a flexible circuit board. In another embodiment, the Z-axis position sensor 42 is electrically connected directly to the Molded Interconnect Device 49. The Z-axis position sensor 42 is preferably a magnetic encoder or an optical encoder.

Figure 3:
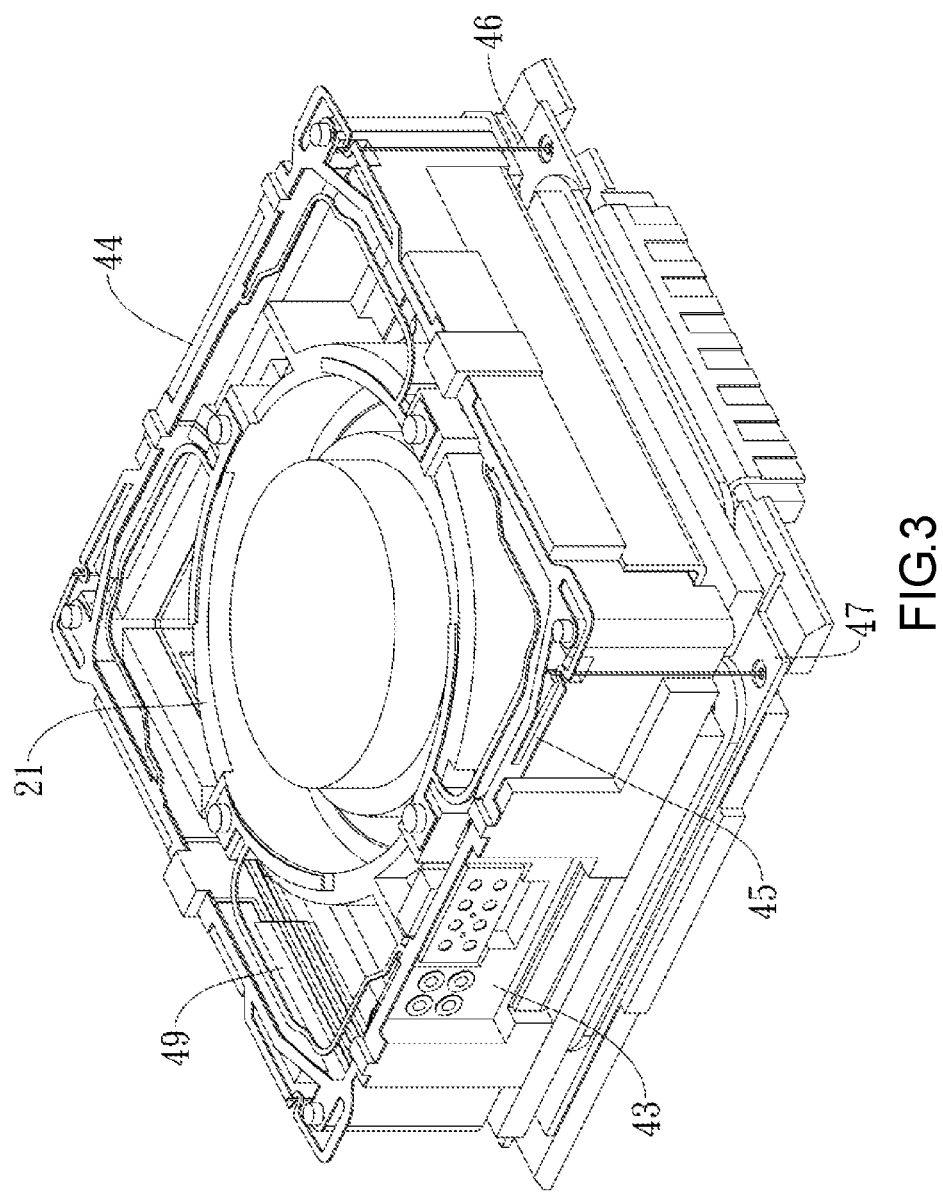
FIG. 3 is a perspective view of the tri-axis anti-shake structure.

Referring to FIG. 1 and FIG. 3, there is shown in FIG. 3 a perspective view of the tri-axis anti-shake structure. The plurality of electrical signals are electrically connected through the conducting wires of the Molded Interconnect Device 49 to the first conductive elastic bodies 45 fixed to the frame 44, respectively. The first conductive elastic bodies 45 each forms an upper plate spring on the frame 44 and are disposed in a manner that the lens holder 21 received in the frame 44 is kept moving in the light axis direction. The plurality of electrical signals of the Z-axis position sensor 42 are electrically transmitted to contacts electrically separated from each other and corresponding in position to the first conductive elastic bodies 45 through the conducting wires of the Molded Interconnect Device 49, respectively. A portion of the plurality of electrical signals are electrically connected through a portion of the Molded Interconnect Device 49 and the first conductive elastic bodies 45 to a Z-axis driving electromagnetic component 22 disposed at the lens holder 21. The Z-axis driving electromagnetic component 22 is preferably a coil. The Z-axis driving electromagnetic component 22 is driven to compensate for the shift along Z-axis. Another portion of the electrical signals of the Z-axis position sensor 42 are electrically transmitted through the another portion of the Molded Interconnect Device 49 and the other first conductive elastic bodies 45 to a second conductive elastic body 46 fixed to the frame 44 and electrically transmitted through the second conductive elastic body 46 to a driving circuit board 47 disposed below the frame 44. The upper plate springs formed from the first conductive elastic bodies 45 keep the lens holder 21 moving in Z-axis direction. The second conductive elastic bodies 46 keep the frame 44 moving on a plane (defined by X-axis and Y-axis) perpendicular to Z-axis direction. In an embodiment, the second conductive elastic bodies 46 are each a sling. In another embodiment, the Z-axis position sensor 42 does not require the circuit board 43 but is directly mounted on the frame 44 and thus electrically connected to the Molded Interconnect Device 49; hence, not only is the circuit board 43 not required, but the assembly process is rendered simple.

Figure 4:
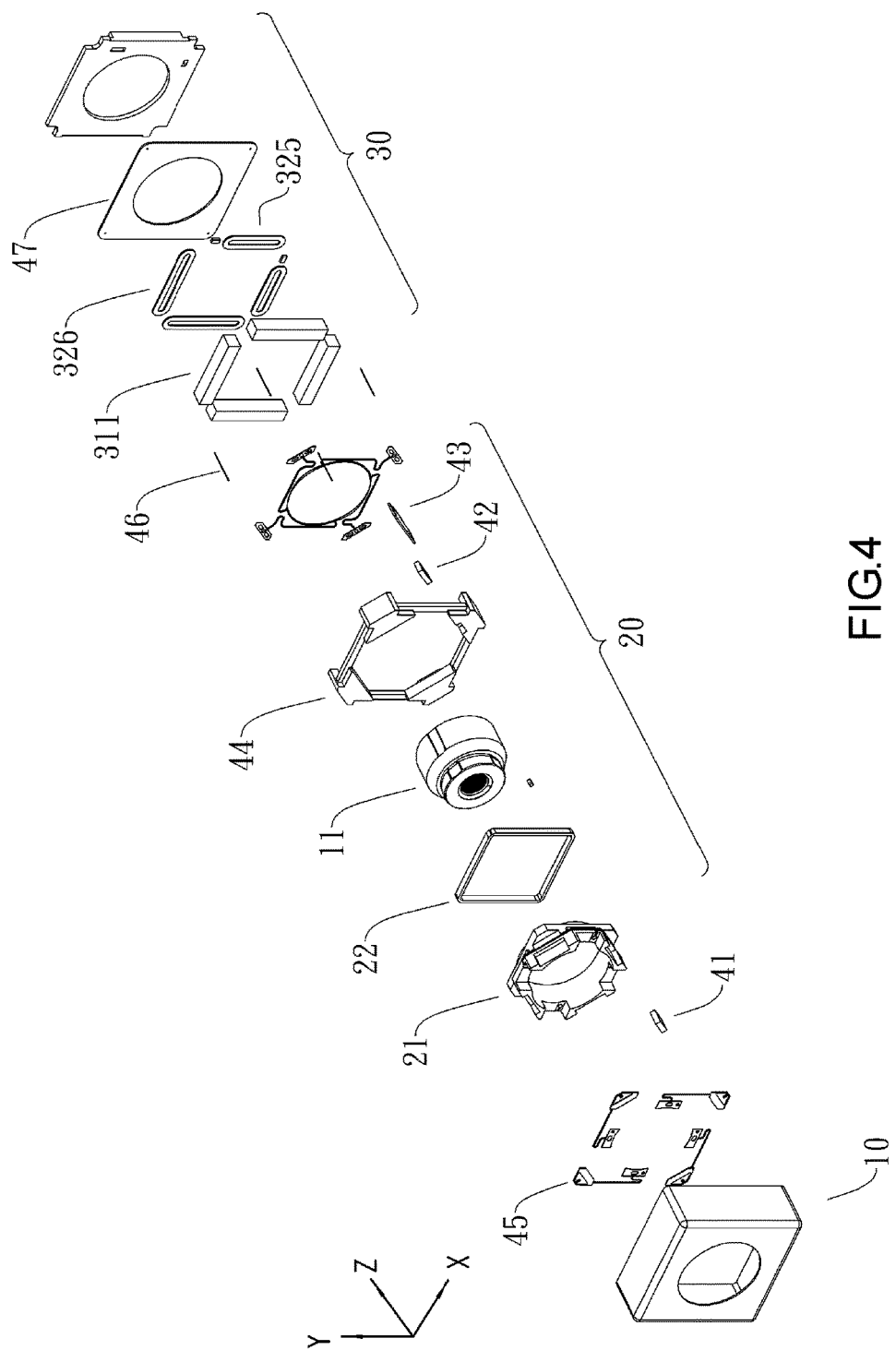
FIG. 4 is an exploded view of a tri-axis anti-shake structure according to the second embodiment of the present invention.

Referring to FIG. 4, there is shown an exploded view of a tri-axis anti-shake structure according to the second embodiment of the present invention.

In the second embodiment of the present invention, the tri-axis anti-shake structure comprises an external frame 10, an optical autofocus module 20, an image anti-shake module 30, and an image sensing component. The optical autofocus module 20, the image anti-shake module 30, and the image sensing component are aligned in a light axis direction.

The optical autofocus module 20 carries a lens 11 and performs autofocus in the light axis direction (z-axis) to focus an image on the image sensing component. The image anti-shake module 30 performs image correction in a direction perpendicular to the light axis direction (x-axis or y-axis).

After the image anti-shake module 30 has used X-axis, Y-axis displacement sensors to sense X-axis, Y-axis displacement shifts, the driving circuit board 47 is informed of the displacement shifts and electrically drives an X-axis driving coil 325 and a Y-axis driving coil 326 to produce an electromagnetic field so as to drive X-axis, Y-axis magnets 311 to undergo X-axis movement and Y-axis movement and thus correct X-axis, Y-axis instantaneous shift positions of the optical autofocus module 20, thereby effectuating X-axis, Y-axis closed-loop anti-shake control.

To enable the optical autofocus module 20 to perform autofocus, a Z-axis position sensor 42 disposed on a circuit board 43 operates in conjunction with a Hall sensor magnet 41 to measure a change in the Z-axis position of the lens by sensing a change in the magnetic field, so as to generate a Z-axis position sensing signal, wherein the Z-axis position sensor 42 is a magnetic encoder or an optical encoder in an embodiment. The Z-axis position sensor 42 sends at least a driving compensation signal to a Molded Interconnect Device 49 of the lens holder 21 through the circuit board 43. In this embodiment, the circuit board 43 is disposed on the lens holder 21, and the Hall sensor magnet 41 is disposed on the frame 44.

Figure 5:
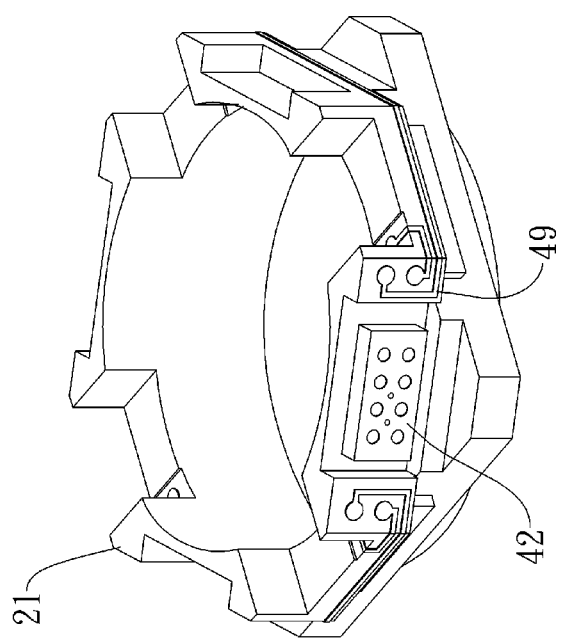
FIG. 5 is a perspective view of a lens holder according to the second embodiment of the present invention.

Referring to FIG. 5, the circuit board 43 is located at a predetermined point of the lens holder 21 and electrically coupled to the Molded Interconnect Device 49 on the lens holder 21. The Molded Interconnect Device 49 comprises conducting wires with a 3D framework. The 3D framework of the Molded Interconnect Device 49 is disposed on the surface of the lens holder 21. The two ends of each conducting wire are in electrical contact with the circuit board 43 and a corresponding one of the first conductive elastic bodies 45, respectively, to form a signal transmission path. In an embodiment, the circuit board 43 is a flexible circuit board. In another embodiment, the Z-axis position sensor 42 does not require the circuit board 43 but is electrically coupled to the Molded Interconnect Device 49 on the lens holder 21; hence, not only is the circuit board 43 not required, but the assembly process is rendered simple.

Figure 6:
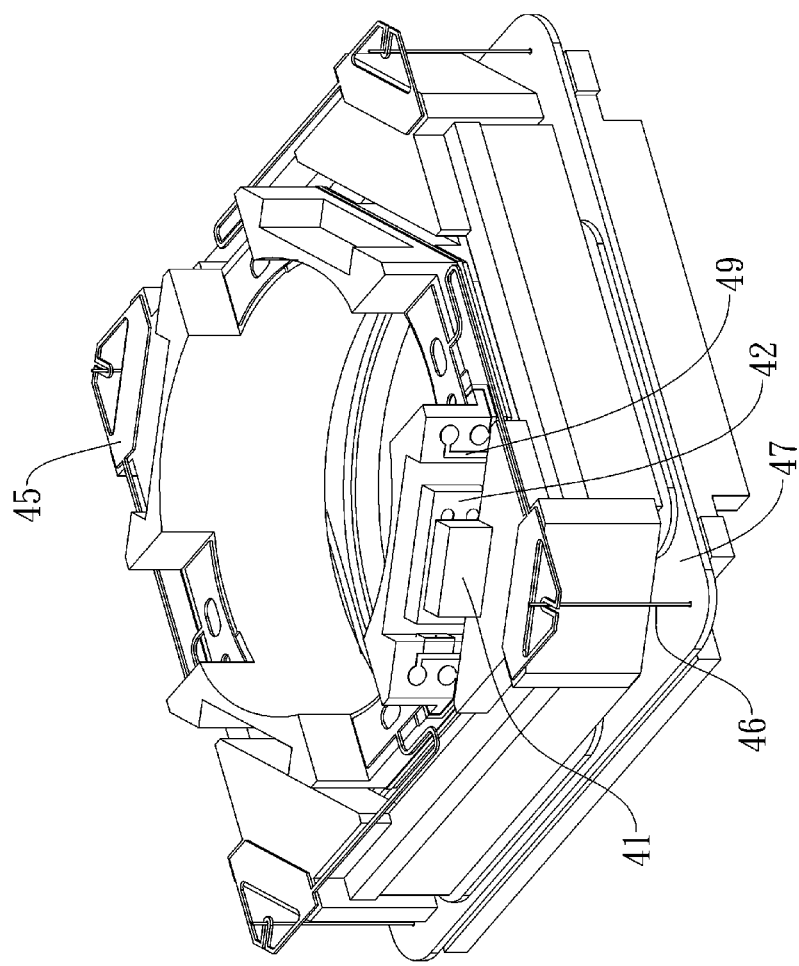
FIG. 6 is a perspective view of the tri-axis anti-shake structure.

Referring to FIG. 6, a plurality of electrical signals of the Z-axis position sensor 42 are electrically connected. For instance, a portion of the plurality of electrical signals of the Z-axis position sensing signals are electrically connected through a plurality of conducting wires of the Molded Interconnect Device 49 to a plurality of first conductive elastic bodies 45 disposed between the lens holder 21 and frame 44. The first conductive elastic bodies 45 are electrically coupled to the second conductive elastic bodies 46, respectively, such that the plurality of electrical signals are electrically transmitted to a driving circuit board 47 through the second conductive elastic bodies 46. The second conductive elastic bodies 46 on the electrical path are disposed between the driving circuit board 47 and the first conductive elastic bodies 45. Another portion of the plurality of electrical signals of the Z-axis position sensor 42 are electrically connected to a Z-axis driving electromagnetic component 22. The Z-axis driving electromagnetic component 22 is preferably a coil. The Z-axis driving electromagnetic component 22 is driven to compensate for the shift along Z-axis. The upper plate springs formed from the first conductive elastic bodies 45 and disposed on the frame 44 keep the lens holder 21 moving in Z-axis direction. The second conductive elastic bodies 46 keep the frame 44 moving on a plane (defined by X-axis and Y-axis) perpendicular to Z-axis direction. In an embodiment, the second conductive elastic bodies 46 are each a sling.

In conclusion, the present invention provides a tri-axis closed-loop anti-shake structure operating in a bi-axis manner, that is, along X-axis and Y-axis, and further equipped with a Molded Interconnect Device to operate along Z-axis, so as to effectuate anti-shake compensation in three axial directions. Furthermore, the present invention is characterized in that: the Molded Interconnect Device effectuates partial electrical connection structurally to replace conventional flexible boards adapted for signal electrical connection and thus enable a production line to not only assemble an anti-shake system easily but also cut the costs of flexible boards.

A tri-axis closed-loop anti-shake structure according to preferred embodiments of the present invention is described above and illustrated with drawings. All the technical features disclosed herein can integrate with the other methods. Each of the technical features disclosed herein can be selectively replaced with an identical, equivalent, or similar target feature; hence, barring conspicuous features, all the technical features disclosed herein merely serve to exemplify equivalent or similar features. After studying the preferred embodiments of the present invention, persons skilled in the art understand that the present invention relates to an invention which has novelty, non-obviousness, and high industrial applicability and thus is worthy of development. The present invention can be modified in various ways by persons skilled in the art and still fall within the appended claims.

What is claimed is:

1. A lens driving device, comprising:
   a lens holder for carrying a lens;
   a frame for receiving the lens holder;
   a first driving component for driving the lens holder to move along a first direction in respect to the frame;
   a base moveably connected to the frame;
   a second driving component for driving the frame to move along a second direction in respect to the base, and
   a position sensor disposed on the frame for sensing a change in a position of the lens holder along the first direction in respect to the frame,
   wherein the first direction is not parallel to the second direction, and the first direction is parallel to an optical axis of the lens.

2. The lens driving device of claim 1, further comprising a circuit disposed on the frame and electrically connected to the position sensor.

3. The lens driving device of claim 2, wherein the circuit comprises a 3-D circuit and the 3-D circuit is disposed on different surfaces.

4. The lens driving device of claim 2, wherein the position sensor is electrically connected to the second driving component through the circuit, a first elastic body and a second elastic body.

* * * * *